United States Patent
Rao

(10) Patent No.: US 6,272,334 B1
(45) Date of Patent: Aug. 7, 2001

(54) CALL MANAGEMENT FOR A MULTI-SITE MOBILE RADIO DISPATCH NETWORK

(75) Inventor: Suresh K. Rao, Lewisville, TX (US)

(73) Assignee: Uniden America Corporation, Fort Worth, TX (US)

( * ) Notice: Subject to any disclaimer, the term of this patent is extended or adjusted under 35 U.S.C. 154(b) by 0 days.

(21) Appl. No.: 09/160,198

(22) Filed: Sep. 11, 1998

(51) Int. Cl.[7] ....................................... H04Q 7/20
(52) U.S. Cl. .................... 455/418; 455/422; 455/507; 455/509; 455/514; 455/518; 455/520
(58) Field of Search .................... 455/507, 509, 455/512, 514, 518, 519, 520, 422

(56) References Cited

U.S. PATENT DOCUMENTS

| | | | |
|---|---|---|---|
| 5,203,015 | 4/1993 | George | 455/34.1 |
| 5,214,789 | 5/1993 | George | 455/33.2 |
| 5,497,508 | 3/1996 | George | 455/161.2 |
| 5,517,677 | 5/1996 | Moon | 455/161.1 |
| 5,557,606 | 9/1996 | Moon et al. | 370/31 |
| 5,566,388 * | 10/1996 | Brame et al. | 455/520 |
| 5,613,201 * | 3/1997 | Alford et al. | 455/520 |
| 5,634,196 | 5/1997 | Alford | 455/54.2 |
| 5,649,298 * | 7/1997 | Ablay | 455/520 |
| 5,650,995 * | 7/1997 | Kent | 455/520 |
| 6,005,848 * | 12/1999 | Grube et al. | 370/518 |
| 6,021,326 * | 2/2000 | Nguyen | 455/422 |
| 6,038,212 * | 3/2000 | Galand et al. | 370/216 |

* cited by examiner

Primary Examiner—Daniel Hunter
Assistant Examiner—Yemane Woldetatios
(74) Attorney, Agent, or Firm—Sidley & Austin

(57) ABSTRACT

A multi-site dispatch communication network includes a hub controller programmed to expedite the connection between multiple radio cells to accomplish a broadcast of the radio transmission. A routing table is employed to provide an association between the various group identification codes and the respective mobile radio cell sites servicing members of the group. A connection table is employed to identify the resources utilized in the dispatch communication connection. When a dispatch communication is initiated, the routing table is accessed to determine which mobile radio cell sites service the various members of the group. When a connection is made to establish the dispatch communication, the connection table is written with information concerning the resources utilized to complete the dispatch communication. In this manner, dispatch communications can be quickly established and terminated. The resources of the network are thereby optimized.

19 Claims, 6 Drawing Sheets

FIG. 2

| RGN | ROUTING RECORD |
|---|---|
| 0 | ROUTING RECORD 0 |
| 1 | ROUTING RECORD 1 |
| 2 | ROUTING RECORD 2 |
| 3 | ROUTING RECORD 3 |
| 4 | ROUTING RECORD 4 |
| ... | ... |
| RMAX | ROUTING RECORD RMAX |

| GROUP NUMBER | N | | | | |
|---|---|---|---|---|---|
| NUMBER OF CELLS | C | | | | |
| STATUS | S | | | | |
| INDEX | 0 | 1 | 2 | 3 | ... M |
| GID | GID N0 | GID N1 | GID N2 | GID N3 | ... GID NM1 |
| CELL ID | 0 | 1 | 2 | 3 | ... M |

FIG. 3

| SLOT NUMBER | CONNECTION INFO RECORD |
|---|---|
| 0 | CONNECTION INFO 0 |
| 1 | CONNECTION INFO 1 |
| 2 | 0 |
| 3 | 0 |
| 4 | CONNECTION INFO 4 |
| ... | ... |
| CMAX | CONNECTION INFO 0 |

Connection Info 0 (150):

| RGN | N | | | | |
|---|---|---|---|---|---|
| IN USE FLAG | C | | | | |
| NUMBER OF CELLS | | | | | |
| INDEX | 0 | 1 | 2 | 3 | ... M |
| CELL ID | 0 | 1 | 2 | | ... M |
| LINE INDEX | L 0x | L 1x | L 2x | L 3x | ... L Mx |
| PORT NUMBER | P 1 | P 2 | P 3 | P 4 | ... P M |
| GID | GID N0 | GID N1 | GID N2 | GID N3 | ... GID NM |
| TIMER ID | T N0 | | | | |

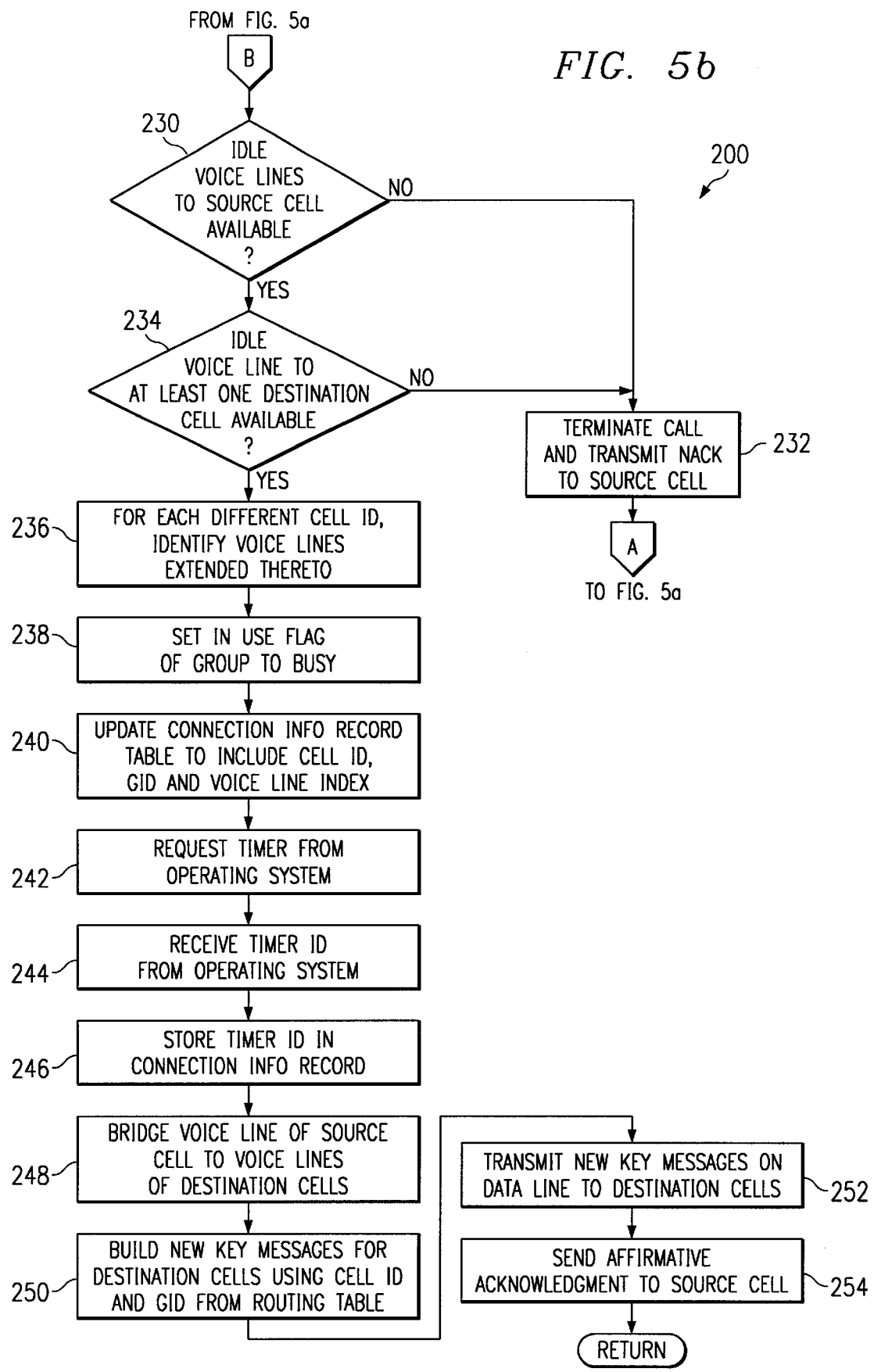

CALL MANAGEMENT FOR A MULTI-SITE MOBILE RADIO DISPATCH NETWORK

RELATED APPLICATION

U.S. patent application Ser. No. 08/743,471, filed Nov. 4, 1996, titled "Trunked Multi-Site Dispatch Network for Trunking Radios", the entire discourse of which is incorporated herein by reference.

TECHNICAL FIELD OF THE INVENTION

The present invention relates in general to dispatch communication apparatus and related techniques, and more particularly to a technique for completing telephone line connections between a mobile radio hub and plural mobile radio cell switches.

BACKGROUND OF THE INVENTION

Many types of communications between remote locations rely on the use of the public switched telephone networks (PSTN). The most typical use of the telephone network is the dial-up of a directory number to establish a talking path between an originating station and a destination station, whereupon the telephone line remains busy for as long as the audio or data signals are being transmitted. After the communication is terminated, both stations go on-hook and the telephone line is idled.

There exist other systems, some of which are utilized in mobile radio communications, in which the public switched telephone network is utilized to provide both data and audio communications between plural mobile radio cell switching systems and a centralized hub controller. In this type of environment, the communications are of the dispatch type, or better known as push-to-talk (PTT). Each time a mobile radio is keyed, an idle radio channel is selected. The originating party may typically speak for several seconds, in which event the audio signals are transmitted via the mobile radio antenna to a local cell switching system. The cell switching system locally associated with the originating communication then transmits via an antenna the dispatch radio signals to other mobile radios in the radio transmission area. The originating cell switching system also transmits data signals on a data line, and after a talking path is established, transmits the audio signals via a telephone line through the PSTN to the hub controller. Based on the group to which the originating mobile radio is assigned, the hub controller bridges the telephone line from the originating cell switching system to the corresponding telephone lines of yet other cell switching systems so that all the mobile radios assigned to the group can receive the audio signals. In this manner, the destination cell switching systems that are located outside the radio transmission range of the transmitting cell can nevertheless receive the audio portion of the dispatch communications.

Even though the communications between each of the various mobile radios may be only a few seconds, the telephone audio and data lines interconnecting the cell switches to the hub controller are always "off-hook", thereby remaining ready to carry any of the dispatch audio signals. It can be appreciated that if a telephone line had to be dialed and established for each communication, the delay period would be unacceptable and the bidirectional communications of audio signals would be extremely cumbersome and burdensome. It can be seen that an expedited completion of a dispatch-type communication is of utmost importance.

Many mobile radio systems are configured so that a respective data line, which is typically a telephone line carrying modem signals, is coupled between each cell switch and the hub controller. Associated with each data line are one or more telephone lines for carrying the audio dispatch communications noted above. Depending upon the configuration of the system, the telephone lines can be idled, if not used within a period of several minutes. In such a system, during periods of low usage, at least one audio line of a cell switch will always remain active, and the remaining audio lines may be automatically disabled after a predefined time, but reactivated should the dispatch traffic increase to a level such that one audio line cannot handle the traffic conditions without encountering significant delays.

It is a well known practice to process dispatch communications of different groups of mobile radios by a single cell switching system. One group of mobile radios providing communications between police officers, and another group which is allocated for communications between taxi drivers can all be accommodated by a single cell switching system. The cell switching system maintains the communications separated between the groups by the use of respective group identification numbers (GID) that are uniquely associated with each group. Each mobile radio of a group has programmed therein the unique group identification so that when the mobile radio is keyed, the group identification is transmitted to the cell switching system in a frame of data. Accordingly, the cell switching system can then retransmit data with the GID embedded therein so that the other mobile radios in the group can decode the same and receive the wireless transmission. Other mobile radios of a different group not programmed with the unique GID cannot receive the communications, and thus the dispatch-type of communications can remain distinct as between the various groups.

It is possible for each cell switching system to accommodate many different groups, ranging up to 255 groups. In addition, any number of mobile radios can be active within a group. It can be appreciated that with the number of mobile radios being active, and with the communications being generally one or two seconds long, it is necessary for the cell switching system to quickly process the incoming key command and provide communications to the other members of the group. The processing must be efficient and fast. In practice, geographically remote cell switching systems are interconnected by a hub controller. Standard telephone lines coupled between the hub controller and the various cell switching systems provide the transmission medium in which dispatch communications from a group in one cell can be coupled to the members of the same group located in another cell. In this situation, the hub controller must not only determine which group is to be involved in a dispatch communication, but also must determine which destination cell sites are then serving the various members of the group. This extended range of service tends to slow down the processing of the dispatch calls, in that the hub controller must not only determine which cell sites might be involved as a destination for the dispatch call, but also the particular telephone lines connected thereto must be polled to determine if they are idle. Moreover, the key command from the originating mobile radio must be retransmitted by the hub controller over respective data lines connected to the destination cell switching systems.

The utilization of a hub controller and multiple cell switching systems to provide wide-area coverage for groups of mobile radios is further exacerbated when two mobile radios belonging to the same group attempt the initiation of dispatch calls at the same time. This contention for service must be resolved, as it is impractical for destination mobile radios of the group to simultaneously receive different originating dispatch communications. Again, if such a contention for service is not resolved in an expedited manner, the entire dispatch communication system can be bogged down with the processing of the calls by the hub controller.

From the foregoing, it can be seen that a need exists for a technique to manage dispatch communications in an efficient manner to thereby improve the throughput of the system. Another need exists for an improved technique for determining the various members of a mobile radio group, and with which cell switching system they are presently associated so that the voice message from the originating mobile radio can be efficiently broadcast to the appropriate cell switching systems. Another need exists for an efficient manner of maintaining an account of the switching connections associated with dispatch calls so that when a communication is terminated, the apparatus of the switching path can be quickly idled and prepared for reuse. Yet another need exists for an efficient technique to resolve the attempted simultaneously initiation of a dispatch communication by two members of the same group.

SUMMARY OF THE INVENTION

In accordance with the principles and concepts of the invention, there is disclosed a technique for carrying out dispatch-type of radio communications that overcomes or reduces the shortcomings and disadvantages of the prior art systems. In accordance with a primary aspect of the invention, a programmed table structure is utilized to efficiently determine all of the members of a mobile radio group and the respective cell switching systems associated therewith. The software table is structured so that it can be determined whether any member of the group is presently involved in a dispatch communication, with minimal searching through the table. According to a preferred embodiment of the invention, a table structure is also utilized to maintain an account of the lines and apparatus utilized for each on-going dispatch communication, so that the allocation of resources can be efficiently managed and carried out. In addition, this table structure allows an expedient disconnection of the dispatch communication in response to either a dekey command received from a mobile radio, or after the expiration of a predetermined period of time.

According to the preferred embodiment of the invention, the hub controller is programmed with a routing table and a connection table. The routing table includes a number of entries, or routing records, each indexed by a routing group number. Each record of the routing table identifies a mobile radio group by a group identification number, and the number of cell switching systems in which at least one mobile radio of the group is situated. Each cell site is identified in the routing table, as well as the group identification number assigned by the respective cell site, it being realized that the members of the same mobile radio group may have different group identification numbers at respective cell sites. The routing table further includes the general number of the group, the number of cell sites involved, and the functional status of the group. With this type of table structure, when a dispatch communication is initiated, the group identification number extracted from the data message can be utilized to search the routing table to find a matching group identification number, whereupon all of the routing information for completing the dispatch communication is readily available.

According to the preferred embodiment of the invention, the hub controller is programmed to include a connection table in which the hardware connection information of each dispatch call is maintained for easy and efficient reference. The connection table includes a slot or entry index corresponding to connection information data for each mobile radio group. The record includes numerous fields, one including a busy/idle field to readily identify whether any mobile radio in the group has requested or is involved in a dispatch communication. In addition, each connection information record associated with a respective group includes information concerning the general group number, the number of cell switching systems associated with the group, an index, a cell ID for each cell switching system, a line index identifying the particular voice lines then assigned to the dispatch communication, physical port numbers of the equipment, and the group identification number assigned by each cell switching system to the respective group. Lastly, the connection information record includes a timer ID. The timer ID is associated with a software timer that prevents a dispatch communication from extending beyond a predefined period of time. The timer assures that radio communication resources are not tied up for extended periods of time, should dekey commands fail to be received by the hub controller, or due to other anomalies that might occur.

The implementation of the routing table and the connection table allows the hub controller to establish and terminate dispatch communications in a highly efficient manner.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts or elements throughout the views, and in which:

FIG. 2 illustrates the structure of the routing table;

FIG. 3 illustrates the structure of the connection table;

FIGS. 5A and 5B are software flowcharts illustrating the programmed operation of the hub controller in establishing and terminating dispatch communications.

DETAILED DESCRIPTION OF THE INVENTION

Figure 1:
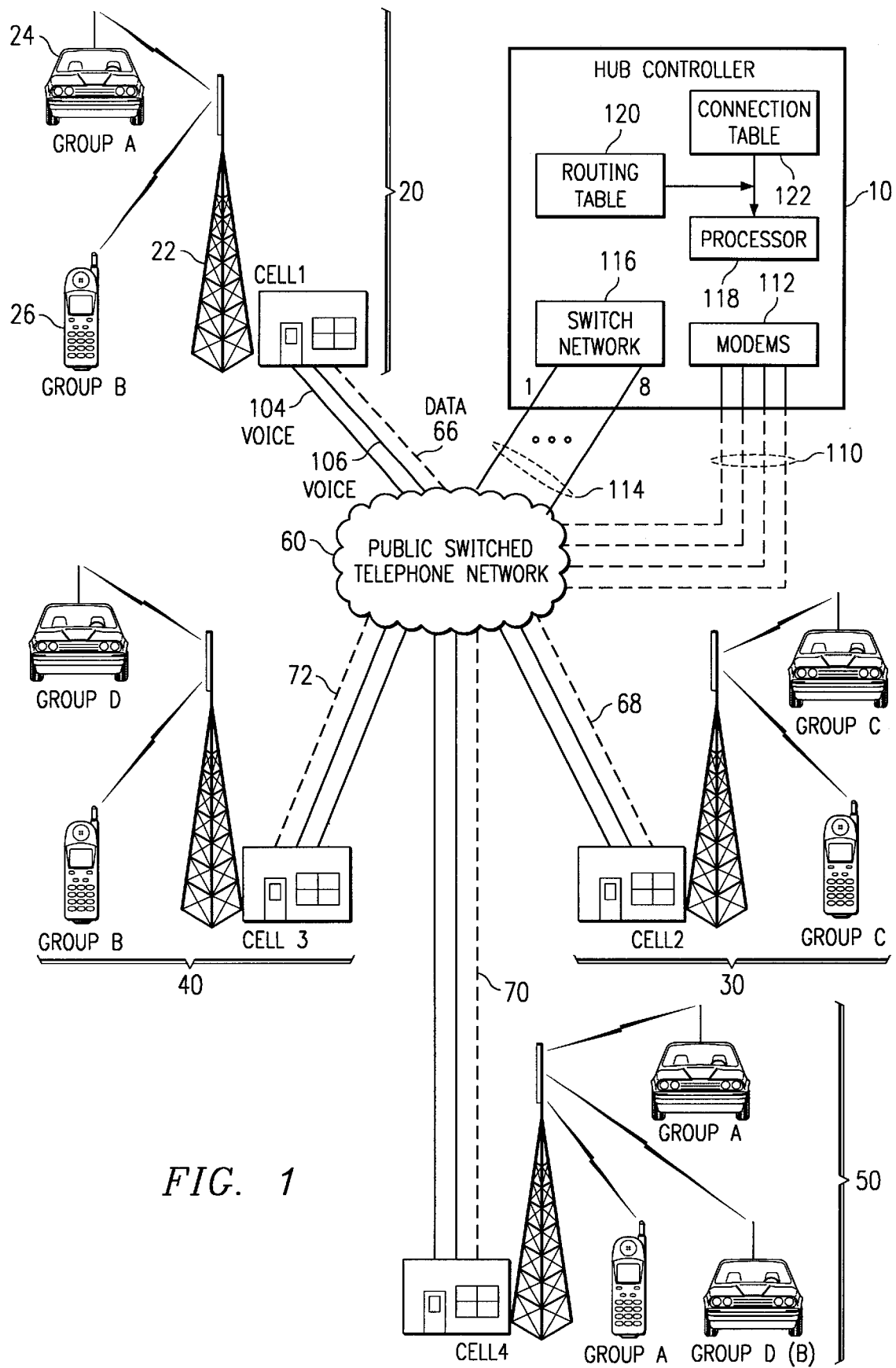
FIG. 1 is a generalized block diagram of a mobile radio network having a plurality of radio cells controlled by a hub controller, and all connected together via the public switched telephone network.

Set forth below is a generalized description of an environment in which the invention is ideally suited for operation, it being understood that many other applications are possible. In accordance with the preferred embodiment of the invention, there is illustrated in FIG. 1 a number of radio cells networked together to provide dispatch-type of radio communications. The area of communications coverage constitutes the composite of the area serviced by the individual radio cells. According to the preferred form of the invention, a hub controller 10 coordinates the dispatch communications transferred by land lines between each of the radio cells. According to the network configuration shown in FIG. 1, each radio cell, for example, cell 1 identified by reference numeral 20, includes the conventional equipment such as a transmit-receive antenna 22, radio transceivers of one or more groups, such as group A identified by reference numeral 24 and group B identified by reference numeral 26, as well as other groups (not shown). There may be up to 255 groups serviced by a single cell switching system 20. As can be seen, the members of mobile radio group A extend from radio cell 20 to radio cell 50. Mobile radio group B extends from cell 20 to cell 40, as well as to cell 50. Mobile radio groups can thus extend beyond the free space transmission area of the antenna of the cell originating the dispatch communication, due to the provision of telephone lines, or other transmission mediums extended between the mobile radio cell sites.

It is important to understand that the group number of a mobile radio group need not be the same in each of the radio cells, as such number is assigned by the individual radio cells. As an example, group B mobile radios are operational in radio cell 50, but are designated as group D. The designation "D(B)" signifies that the radio group B is designated as group D in the cell 50. With this versatility, it is necessary that the hub controller 10 maintain an accurate account or cross-reference of the locations of the various radio groups, irrespective of the identities locally assigned to the groups. While the group numbers need not be unique in the overall radio dispatch network, it is necessary that each group maintain the same respective group number within a single radio cell. As will be described in more detail below, there is utilized a routing group number to maintain an association of the mobile radios of a group as might be distributed throughout the network.

The mobile radios may be of different varieties, including vehicle mounted, hand held units, etc. The radio cells include conventional radio equipment adapted for trunking a number of repeaters to provide push-to-talk communications between the radio transceivers of a group. While not shown, the radio cells may include additional equipment for carrying out full-duplex communications.

Each radio cell is connected to a hub controller 10 via the public switched telephone network (PSTN) 60 by way of respective data lines 66–72. The data lines are shown as broken lines to distinguish them from the audio voice lines. Only a single data line per radio cell is necessary for connection to the PSTN 60 and for carrying data signals in the nature of data packets. In other applications, multiple data lines can be utilized. Each data line 66–72 can be a standard telephone line for carrying modem-generated data signals at any data rate, preferably at least 9600 bits per second. In addition to a data line, each radio cell is connected via the public switched network 60 to the hub controller 10 by one or more telephone voice lines, such as voice lines 104 and 106 that connect the respective voice ports of the first radio cell 20 to the public switched telephone network 60. Each radio cell is not required to have the same number of telephone voice lines as the other cells in the network. Rather, the number of telephone voice lines needed is largely a matter of the radio traffic encountered by the individual radio cells. Where a radio cell has a large amount of dispatch-type of communication traffic, such cell will naturally be provided with more telephone voice lines than another cell in the network that experiences less dispatch-type of communications traffic. In the detailed description of the invention which ensues, it will be assumed that each radio cell is structured to operate with the Enhanced Sub-Audible Signaling (ESAS) protocol described in the specifications X-WP-0004G-2/93 and ESAS-0046-ARX-3100_MSD. However, the principles and concepts of the invention are equally applicable to other types of communication systems operating with different protocols.

The hub controller 10 is connected to the public switched telephone network 60 by way of plural data lines 110. Indeed, in the preferred form of the invention, there is one data line of the group 110 for each radio cell connected as a network. In view that there are four radio cells shown in the example in FIG. 1, there is a group of four corresponding data lines 110 connecting the hub controller 10 to the PSTN 60. Each data line 110 is connected to a respective modem 112 of the hub controller 10. The modems 112 of the hub controller 10 are preferably of the same speed as the corresponding modems (not shown) that connect each cell data line to the processor of the radio cell. As is well known in the art, modems are automatically adjustable in speed, but ultimately operate at the same speed.

The hub controller 10 also includes plural telephone voice lines 114 connected to the PSTN 60. In the preferred form of the invention, for each telephone voice line connecting a radio cell to the PSTN 60, there is a corresponding telephone voice line 114 connecting the PSTN 60 to the hub controller 10. In the example show in FIG. 1, since each of the four radio cells has two telephone voice lines connected to the PSTN 60, the hub controller 10 includes at least eight telephone voice lines 114 connected to the PSTN 60. With this arrangement, four simultaneous dispatch communications can be handled. Each telephone voice line 114 of the hub controller 10 is connected to an N×N switching network 116 for connecting any one of the telephone voice lines 114 to any of the other telephone voice lines thereof. In the preferred form of the invention, the switching network 116 is of the type adapted for connecting one incoming telephone voice line 114 to plural outgoing telephone lines 114 to provide a broadcast capability of voice signals. One dispatch transmission from a source radio can thus be heard by plural destination mobile radios belonging to the particular group and located throughout the network. Switching networks 116 of such type are conventionally available with AG8 type printed circuit cards obtainable from Natural Microsystems. In such types of circuits, the analog voice signals are converted to corresponding digital signals, switched to the desired output lines, and then reconverted to analog signals for transmission on the desired output lines directed to the PSTN 60. Other types of conventionally available time or space switching networks can function with equal effectiveness.

The hub controller 10 also includes conventional telephone line signaling equipment to provide dial tone, busy signals, off-hook and on-hook conditions, DTMF transmitters and receivers, etc. The hub controller 10 is preferably programmed with an operating system such as Windows NT for carrying out the dispatch communication functions, as well as the operations to be described in detail below. The software developed for providing hub controller functions is the C++ code. The telephone line cards typically accommodate a set number of lines, such as eight. Digital line cards employed with T1, E1, and other digital carrier transmissions can also be utilized for increased call capacity. The physical appearances of the telephone lines as connected to the various line cards are identified as card 1, port 1, port 2, . . . port 8; card 2, port 1, port 2 . . . port 8, and so on. The telephone lines are identified differently in the software. The telephone lines are designated in software as port 1, 2, 3 . . . 32, irrespective of the particular line card involved. In addition, each telephone line itself is identified by a "line index" number.

The hub controller 10 also includes a program-controlled processor 118 that is programmed to operate in several modes to coordinate dispatch-type of communications between the various radio cells. Indeed, the hub controller 10 can itself be any of the numerous conventionally available personal computers that can accommodate modems 112 and can support conventional circuit cards, such as the switch network 116, line interface cards, etc. In an initialization mode, the hub controller 10 sequentially communicates to each radio cell via a respective data line 110 to establish each of the telephone voice lines in an operational off-hook condition. The off-hook condition can be maintained indefinitely, or for a programmed period of time, or placed in an on-hook condition after a predefined period of inactivity. When all of the telephone voice lines connected to each of the radio cells are off-hook, dispatch-type of voice signals can be passed on the voice lines from an originating radio cell and broadcast to plural destination radio cells, all under the control of the hub controller 10. Further, the push-to-talk commands, such as commands indicating the transceiver radio switch has either been pushed (keyed), or released (dekeyed), and other commands, can be passed on data lines between the respective radio cells and the hub controller 10. In this manner, the hub controller 10 functions as a master device in transferring the voice signals from an originating cell to the other destination cells via the PSTN 60.

It should be noted also that as to each individual radio cell, it operates autonomously in providing transmit and receive signals between each of the transceivers served directly by such cell. However, when such signals are to be transferred to the other radio cells in the network, the hub controller 10 selects and bridges together the various telephone voice lines for transferral of the voice signals to be broadcast to the destination cells. The hub controller 10 is programmed with appropriate tables 120 and 122 that identify each radio transceiver of a group, such that when one transceiver of the group transmits, all other transceiver of the group receive the same communication, irrespective of which radio cell is presently serving the respective transceivers. To that end, the hub controller 10 essentially carries out a trunking function with regard to the telephone voice lines that connects each radio cell to the public switched telephone network 60.

The hub controller 10 generally operates in the initialization mode only when bringing the hub on line with regard to the radio cells. However, should a new radio cell be added subsequent to the initialization of the overall system, a portion of the initialization routine can be carried out to initialize the new radio cell.

Subsequent to the initialization mode, the hub controller 10 is placed in a conversation mode. In the conversation mode, the hub controller 10 detects data signals transmitted by an originating cell on the respective data lines, indicating that a transceiver radio has been keyed in the vicinity of the radio cell. Idle telephone voice lines can then be selected by the hub controller 10 to couple the voice signals via the PSTN 60 to the other radio cells. As will be set forth more fully below, when the hub controller 10 receives a radio key command on a data line, idle telephone voice lines directed to the other radio cells are selected. Busy-idle tables of the voice lines are flagged and updated appropriately by the hub controller 10. When the hub controller 10 receives a dekey command, the respective telephone voice lines are then idled and can thereafter be used for servicing the transceiver in response to key commands of other radios. The dekey commands of communication radios are processed in accordance with an end of transmission mode carried out by the hub controller 10. In this manner, the hub controller 10 allows the networking of dispatch type of radio communications amongst two or more radio cells. The various transmission protocols and formats, as well as the software routines of the hub controller 10 are described in detail in pending U.S. patent application Ser. No. 08/743,471 filed Nov. 4, 1996.

While not shown, the data packets communicated on the data lines between the hub controller 10 and the radio cells each include a one-byte start field to indicate the start of a data packet frame, a one-byte field identifying the type of communication, and a two-byte field identifying the length of a data field. The data field following the length field is of variable length, and includes a command field, and other fields that can identify a group I.D., a correlator number, index number, telephone number, etc. Following the data field is a two-byte field for error checking purposes, and lastly a one-byte field that identifies the end of the transmission frame.

The various command fields that are placed in the data field include a key, acknowledgment, negative acknowledgment, dekey, initialization, and telco index commands. The key command is transmitted in a data packet by a radio cell in response to a transceiver radio being keyed to transmit voice communications. In the data portion of the key command data field, there are four bytes of data allocated to the group identification of the group in which the transmitting radio is assigned. Two bytes of data are also included as an index field to identify a particular telephone voice line on which dispatched communications are to be carried out in response to the key command. Data is placed in the index field by the hub controller 10 to identify to the destination radio cell the particular interconnecting telephone voice line that is to be used.

An acknowledgment (ack) command also includes in the data field a group I.D. number and an index number. The acknowledgment command is transmitted by the hub controller 10 in response to receipt of a key command data packet, to acknowledge to the radio cell on the data line a receipt of the key command. The acknowledgment command is also transmitted by a radio cell after it has received both a test data packet on the data line and audio tones on the telephone voice line.

A negative acknowledgment (nak) is a command transmitted by either a radio cell or the hub controller 10 when it has received an incomplete data packet. The nak command includes a group I.D. number, but no index field.

A dekey command is transmitted by a radio cell when the transmit button or switch of a transceiver is released. The dekey command includes a group I.D. field and an index field identifying the telephone line utilized. Receipt of a dekey command is effective to idle the voice line by the hub controller 10 and allow it to be subsequently used for a new key command.

The initialization (init) command includes a correlator number field assigned by the hub controller 10 to a particular radio cell during the initialization mode. The correlator field includes a random number generated by the hub controller 10. Also in the initialization command data field is a telephone number field containing the directory number assigned by the public-switched telephone network to a telephone line connected to the hub controller 10. When the hub controller 10 transmits a frame of data to a radio cell over a data line, which has the initialization command therein, the radio cell is thereby assigned a unique correlator number in the correlator field, as well as a telephone directory number in the respective field. Thus, when a radio cell establishes a telephone connection to the hub controller 10, such connection can be established by the radio cell dialing the directory number that exists in the directory number field. In like manner, when the PSTN 60 applies ringing signals to the telephone line 114 assigned the telephone number in the telephone number field, the hub controller 10 can respond to the ringing and trip the same to establish an off-hook voice line between the particular radio cell and the hub controller 10.

Lastly, a telco index command includes an index field which again identifies the index number of a telephone voice line that is utilized by the particular radio cell. A correlator number field is utilized for carrying a correlator number assigned to the radio cell by the hub controller 10.

From the foregoing, it can be appreciated that every data transmission on the data line, such as line 66 in FIG. 1, incorporates a data packet with one of the six types of commands. The particular data fields utilized are based on the type of command which is assigned by either the processor in the radio cell, or the programmed processor 118 in the hub controller 10, depending on which processor is then in the modem transmitting mode.

As noted above in connection with FIG. 1, the processor 118 is programmed with a routing table 120 and a connection table 122 to facilitate and expedite the connection of the mobile radios of a group throughout the multi-site dispatch communication network shown in FIG. 1. While the tables 120 and 122 are illustrated as separate software tables, those skilled in the art may prefer to implement some or all of the tables into a single table structure. The routing table 120 is shown in detail in FIG. 2, and the connection table 122 is shown in detail in FIG. 3. The source code in C++ software language for the routing table 120, the routing record 130, and the connection table 122 is set forth at the end of this specification. With reference first to the routing table 120, such table is comprised of a number of routing records, one shown as reference numeral 130. There is a single routing record for each of the mobile radio groups located throughout the multi-site dispatch radio network. Each routing record, such as record 130, is associated with a routing group number 132. The routing group numbers 132 start with the digit zero and numerically increase for each different mobile radio group. It should be noted that all of the information that comprises a routing record 130 is preferably input at a hub controller terminal (not shown) via a graphical user interface. Thus, as new groups are developed, respective routing group records are added to the routing table 120.

The routing record 130 includes information for associating each mobile radio of a group, as may be geographically located throughout the network. In this manner, it can be quickly determined the existence of each mobile radio of a group, as well as its association with a mobile radio cell, as well as the functional status of the group.

With particular reference to the routing record 130 shown associated with the routing table 120 of FIG. 2, such record includes a group number 134 which uniquely identifies the particular mobile radio group to the hub controller 10. As noted above, the mobile radios associated with the same group may indeed be assigned different group numbers by the various cell sites. Nonetheless, a single, unique group number is assigned to the group, and entered into the field 134 of the routing record 130. The number of different cell sites involved with the mobile radio group is placed in the field 136 of the routing record 130. Hence, if three cell sites are involved in the servicing of a group, then the numeral three or a similar designation is programmed in the field 136 of the routing record 130. In the example, if only three mobile radio cell sites are involved, like group B of FIG. 1, then the processor 118 need not search through any more than three columns of the routing record 130. This enhances the ability to complete connections for dispatch communications in a very short period of time. Next, the enabled/disabled or functional status of a group is programmed by an operator at the hub controller 110 in the field 138 of the routing record 130. The enabled or disabled status of a mobile radio group is utilized to efficiently determine whether all mobile radios of the group should be allowed service by the hub controller 10. If the proprietor of the mobile radio group wishes to discontinue service, or if service payments are in arrears, or for a multitude of other reasons, a disabled status of the mobile radio group means that no communications whatsoever can be initiated by any of the mobile radios of the group. An enabled status simply means that dispatch communications will be serviced by the hub controller 10 and carried out in the normal manner for any mobile radio of the group.

The routing record 130 includes an array of fields for a group index 140, a group ID 142 and a cell ID 144. The group index 140 essentially identifies by a numerical number each group ID number and the associated cell ID. It is noted that there is an association of the information in the respective columns of the array. For example, a group index number is associated with a specific group ID which, in turn, is associated with a specific radio cell ID. If, for example, the group number is the same for the first three radio cell sites, then the "GID" entry in the first three fields of the array would also be the same. However, the identification for each cell site of the network is unique, and thus a different number would be entered in each column of the array associated with the cell ID fields 144. With this arrangement, if only three cells are involved with a particular group, then the processor 118 only accesses the first three columns of the array to determine exactly which cell sites are involved, and determine the corresponding group identifications of the group assigned by each cell site.

As noted above, each routing record 130 is indexed by a routing group number (RGN) 132, shown in FIG. 2. In processing a dispatch communication, a mobile radio which has been keyed will transmit its group ID in the frame of data transmitted to the local cell site. The cell site will then communicate to the hub controller 10 via a data line appropriate data information, including the group ID of the radio requesting service. The hub controller 10 will search each routing record of the routing table 120 to find a corresponding group ID. When the matching group ID is found in a routing table record 130, the corresponding routing group number (RGN) is identified, which RGN is then used as a slot number for accessing the connection table 122. It should be understood that once a mobile radio group commences existence, the pertinent information is programmed in the routing table 120 by an operator in association with a specific RGN. The RGN remains set and generally is not changed. As noted above, there is one routing group number 132 and one routing record 130 for each mobile radio group controlled by the hub controller 10.

With reference now to the connection table 122 of FIG. 3, it is noted that the connection table includes a number of connection information records 150, each associated with a different slot number 152. Generally, the extent of slot numbers in the connection table 122 is a function of the number of dispatch calls that can be handled by the hub controller at the same time, which is a function of the number of voice lines extended between the hub controller 10 and the various radio cell sites. When a connection is to be established to complete dispatch communications from a source mobile radio to at least one destination mobile radio, the hub controller processor 118 establishes a corresponding connection information record, such as that shown by reference numeral 150. The first field 154 of the record 150 constitutes the routing group number, exactly as the corresponding RGN 132 found in the routing table 120. However, the RGN written into the field 154 is dynamic, meaning that whatever group has requested service, and such service has been granted, the RGN associated with the group will be written in the field 154 by the hub controller 10. At a different point in time, the slot number of the connection table 122 may be written by the hub controller processor 118 with the RGN of another mobile radio group that requested service and such service was accomplished.

The field 156 corresponding to the "in use flag" is set by the processor 118 as busy during the dispatch call, and then is reset as idle when no mobile radio of the group is involved in a dispatch communication. In another field 160 of the connection information record 150, there is programmed a timer identification number. For reasons to be described below, each dispatch call is allowed a certain amount of time before it is automatically terminated. In addition, in the event that various dekey or other commands are not properly received by the hub controller 10, the connections to the associated call are automatically removed on expiration of the timer. In the preferred form of the invention, the operating system of the processor 118 provides programmable timers for use with each dispatch call, together with corresponding timer identifications which can be stored in the field 160 of the connection information record 150. Hence, if the operating system determines that a timer associated with a specific dispatch communication has expired, the associated timer ID is communicated to the hub controller application program, where the processor 118 searches for the corresponding timer ID in the connection information records. The processor 118 can then proceed in terminating the call and removing the connections as specified by the information in the associated connection information record.

The connection information record 150 includes an array of other information. The array of information includes an index array 162, a cell ID array 164, a line index array 166, a port number array 168 and a group ID array 170.

The index fields 162 simply enumerate the number of columns in the array. The cell ID fields 164 are programmed by the processor 118 to identify the cells involved in the dispatch communication connection. If three cells are involved in the communication, then the ID of each cell is written in the respective column of the array. The line index fields 166 are written with the index numbers of the telephone lines extended from the hub controller 10 to the respective cell sites. It is realized that more than one voice telephone line can extend from the hub controller 10 to the public switched network, and thus to maintain an account of the same, the index number of the telephone line that is assigned to the dispatch communication by the hub controller 10 is written in the appropriate column of the line index field 166. The listing of the telephone lines utilized in a dispatch communication is particularly important when the communication is terminated by a dekey command, so that the line can be quickly reassigned to another dispatch communication. As noted above, the physical port number of the line cards associated with the telephone line is written by the processor 118 in the relevant fields 168. As can be appreciated, for every telephone line utilized, there is a corresponding port number. Lastly, the group identification number is written by the processor 118 in the fields 170, in association with the respective cell ID. In other words, for each cell site involved in the dispatch communication, the group ID involved in the communication and associated with the cell site is written into the respective GID field 170.

It is important to note that for each on-going dispatch communication, there is a corresponding connection information record 150. Moreover, for those dispatch calls that have been terminated, the slot number of the connection table will be vacant, in that no valid connection information record exists. Slot number "1" shown in FIG. 3 is an example. Preferably, the slot numbers of the connection table 122 are assigned in ascending order to those incoming dispatch call requests on a first-come, first-served basis.

The source code for the connection table and the connection information records is attached hereto.

From the foregoing, it can be seen that the routing table 120 is generally programmed by the operator of the hub controller with information that is somewhat static, in that it does not frequently change. The static data provides a relationship with the mobile radios of a group, the related radio cells and IDs, and other information. In contrast, the connection information table 122 is dynamically written and updated by the hub controller processor 118 with data that relates in a transient manner to the dispatch calls that are in progress.

Figure 4:
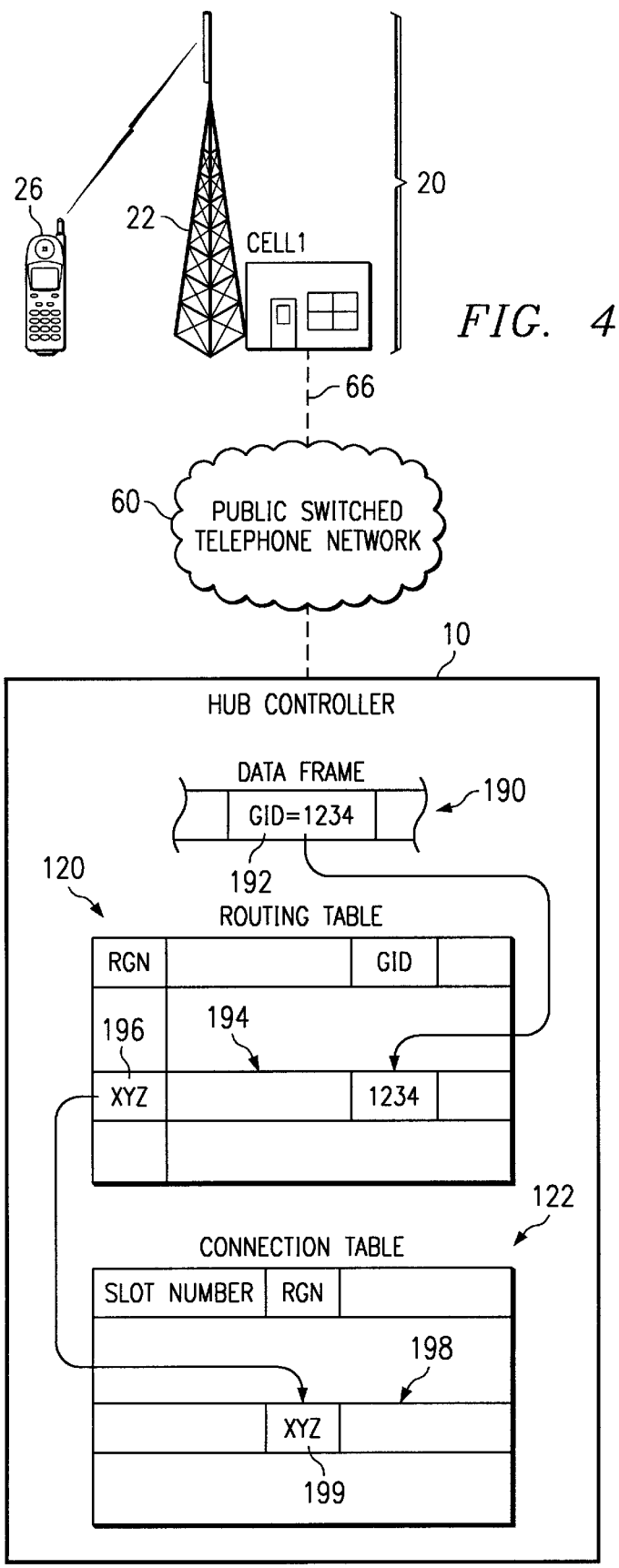
FIG. 4 illustrates in simplified form the use by the hub controller of the routing table and the connection table.

FIG. 4 illustrates in simplified form the utilization by the hub controller 10 of the routing table 120 and the connection table 122. For purposes of example, a user of a mobile radio 26 keys the mobile radio to request dispatch communications. The transmission is preferably of the digital type, where a frame 190 of information is transmitted by the radio, and received by an antenna 22. The antenna 22 is located at a radio cell site 20 that is in the vicinity for servicing many groups of mobile radios. The local cell site 20 relays the frame 190 of data received from the mobile radio 26 on a telephone data line 66 to the public switched telephone network 60. The local cell site 20 is connected to the hub controller 10 by a dedicated telephone line 66 utilized for data transmissions, as well as one or more voice lines dedicated to voice communications. The hub controller 10 receives the frame 190 of data and decodes the field 192 thereof that has the group identification number of the mobile radio 26 initiating the dispatch call. The decoded GID in the example is "1234". Once the hub controller 10 decodes the group identification number from the field 192, such number is used as an index to the routing table 120. The processor 118 in the hub controller 10 sequentially searches the routing table 120 to find a record that has the same decoded group identification number. Once the record in the routing table 120 is found, the relevant routing information associated with the mobile radio 26 is readily available. In addition, the routing group number 196 associated with the record 194 is utilized for cross-referencing the connection table 122. In the example, the RGN is "XYZ". In other words, the same routing group number 196 found in the routing table 120 is used to search the various records 198 of the connection table 122. When the same routing group number is found in the relevant field 199 of a record in the connection table 122, then such record 198 is utilized to find the equipment resources utilized in carrying out the dispatch communication. When a call is initiated, the connection table record 198 is written by the hub controller processor 118 with connection data. When the dispatch communication is to be terminated, the routing group number 199 is utilized for a quick reference to the connection table 122 to find the equipment resources for disconnecting or otherwise terminating the dispatch call.

Figure 5A:
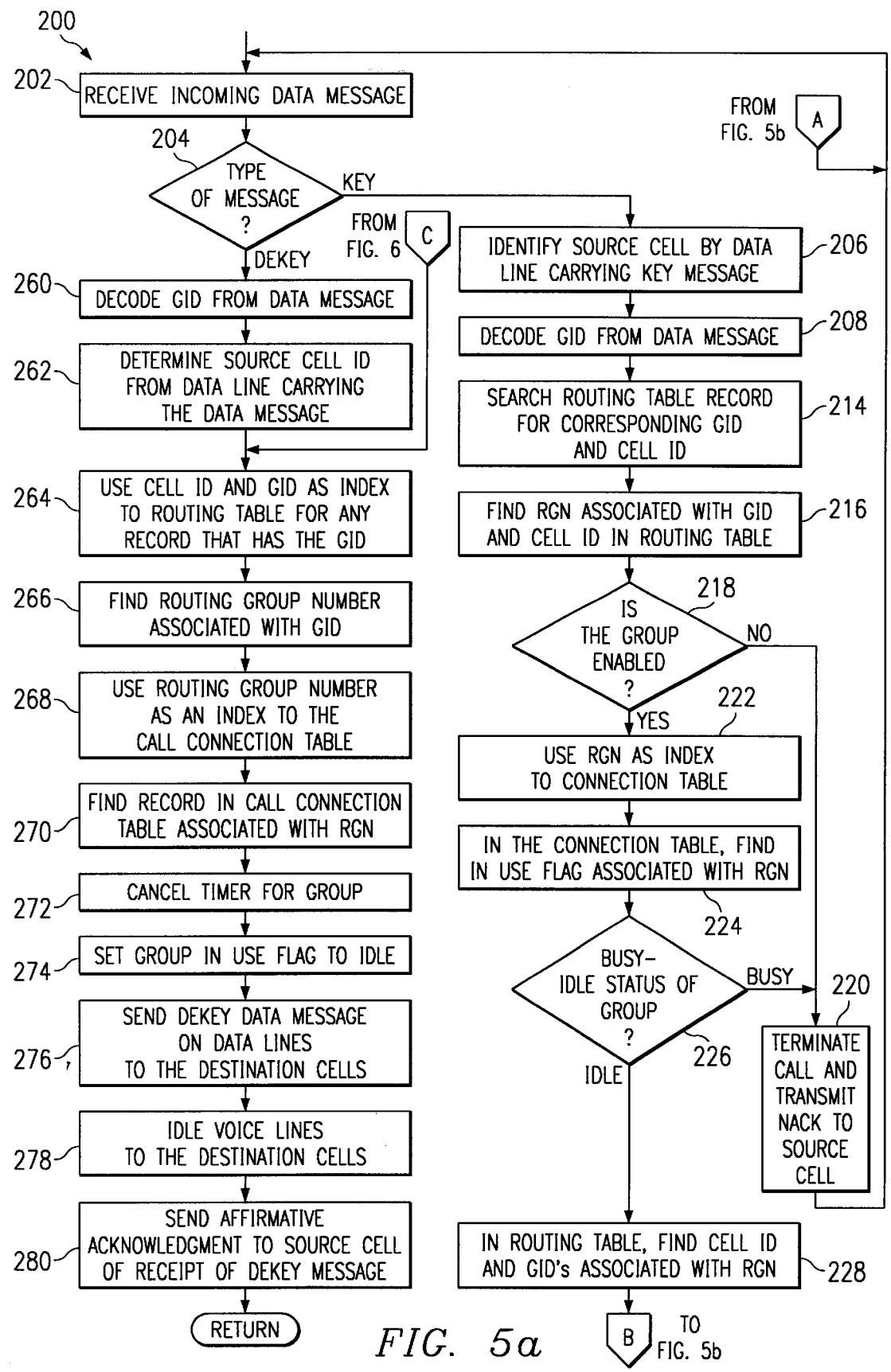

FIGS. 5A and 5B constitute software flowcharts that identify the primary functions carried out by the hub controller 10 in providing dispatch communications between the members of a mobile radio group located throughout the network. According to the flowchart 200, it is assumed that a dispatch call is initiated by an incoming data message received by the hub controller 10 via a data line, from one of the radio cells. The incoming message in the nature of a request for service generally involves a key command from a mobile radio in the geographical vicinity of an originating cell. This is shown as program flow block 202. The hub controller 10 decodes the data message and determines the particular type of command involved. Decision block 204 illustrates that when a key command is decoded, processing branches to program flow block 206. If a dekey command is decoded, then processing branches from decision block 204 to program flow block 260. Assuming first that a key command is decoded from the data message received from the radio cell, the particular radio cell is determined by identifying the data line carrying the key message. This is shown in program flow block 206. In other words, a single data line is uniquely associated with each cell site. Hence, the particular data line on which the key data message is received, is used as an indication of the cell site initiating the dispatch communication. In program flow block 208, the group ID of the mobile radio initiating the key command is decoded from the data message. From program flow block 208, processing proceeds to block 214 where the routing table 120 is searched for a record that contains a corresponding group ID and cell ID. The cell ID can be determined by reference to the routing table 120 where there is programmed the cell ID associated with each group. When the group ID and corresponding cell ID are found in the routing table 120, the corresponding routing group number (RGN) 132 is identified, as shown in program flow block 216. In decision block 218, it is determined whether the group is functionally enabled. The determination of whether the group is enabled or disabled is made by reference to the status field 138 of the routing record 130. If the group is disabled from service by the hub controller 10, processing branches to block 220, where the call is terminated. If, on the other hand, the group is enabled, processing branches to block 222, where the routing group number (RGN) is utilized as an index to the connection table 122.

In the connection table 122, the in-use flag (as written in field 156) associated with the routing group number is identified, as noted in block 224. According to decision block 226, the busy/idle status of the group is determined, based on the state of the in-use flag. When no dispatch communications are being carried out by the group, whether it be a transmission or reception, the in-use flag is set to a state indicating an idle state of the group. On the other hand, when the first key command is transmitted by any mobile radio of the group, and the resources are available for completing the call to at least one destination mobile radio, the in-use flag is set to the state of busy. In decision block 226, if it is determined that the in-use flag already shows that the group is busy, processing branches to block 220 where the dispatch call attempted to be initiated, is terminated. If the in-use flag shows that the mobile radio group is idle, processing branches to block 228 where the cell ID and group ID numbers associated with the routing group number in the routing table 120 are found. Once the appropriate routing information record is found, all of the associated group identifications related to the mobile radio group can be found in the array field 142.

In order to determine if resources are available for completing the dispatch communication, the hub controller processor 118 determines if an idle voice line is available to the source cell site associated with the mobile radio transmitting the key command. This is shown in decision block 230 of FIG. 5B. If an idle voice line is not available to the source cell site, processing branches to block 232 where the dispatch call is terminated. If an idle voice line is available to the source cell site, the processor 118 next determines if an idle voice line is available to at least one destination cell site, as noted in decision block 234. The destination cells can be readily determined by the cell ID field array 144 of the routing table 120 shown in FIG. 2. If one or more voice lines are available to the respective destination radio cells, processing proceeds to block 236 where the idle voice lines to both the source and destination radio cells are identified and written in the line index field array 166 of the connection table 122. It is important to note that while the routing table 120 provides all the group ID's that are associated with the group ID of the mobile radio initiating a dispatch call, resources may not be allocated for connection to each of the destination cells serving the group IDs. If there is no idle voice line extended to one of the destination cells to which the dispatch call should be broadcast, then that destination mobile radio will not participate in receiving the dispatch call. The resources actually allocated to a dispatch call are thus maintained in the connection table 122, and thus to remove the allocated resources after termination of the call, the connection table 122 is consulted, not the routing table. Moreover, the connection table 122 is written with the resources allocated only after it is determined that a dispatch call can be completed, at least from one source radio cell to at least one destination radio cell.

As noted in program flow block 238, the in-use flag of the group is then set to a busy state. This is accomplished by writing the busy state of the group in the field 156 of the connection information record 150.

With reference now to program flow block 240, the connection information record 150 of the connection table 122 is updated as to the particular line index numbers corresponding to the telephone lines found to be idle in decision block 230 and 234. Also, the cell identifications and the corresponding group identifications are written into respective field arrays 164 and 170. By writing such information in the connection table 122, the particular resources are readily available so that the dispatch call can be quickly disconnected in response to a dekey command. As noted above, dispatch communications may typically last about 1–30 seconds. This means that within 1–30 seconds after a key command is processed, a corresponding dekey command will generally be transmitted by the mobile radio and such command will be processed by the hub controller 10.

In program flow block 242, the processor 118 requests from the operating system the start of a timer associated with the dispatch call being processed. It is well known to those skilled in the art that many operating systems, such as Windows NT, provide numerous timer functions for providing predetermined periods of time. Moreover, such operating systems provide an identification for each timer. In the preferred form of the invention, the timer for dispatch communications is typically set to about 30 seconds, although this may vary depending on the particular applications. In program flow block 244, the timer ID associated with dispatch call being processed is received. The timer ID is stored in field 160 of the connection information record 150, as noted in block 246.

Next, the processor 118 bridges the voice line coupled to the source mobile radio cell with the voice lines coupled to the destination mobile radio cells, as shown in block 248. New key messages are then assembled for transmission on respective data lines to the destination mobile radio cells. The cell ID and group IDs transmitted in the data message are obtained from the routing record 130 of the routing table 120. The processing of this function is shown in program flow block 250. In program flow block 252, the newly assembled key messages are transmitted on the respective data lines 110 to the destination cells. Lastly, an affirmative acknowledgment of the dispatch communication is transmitted on a data line from the hub controller 10 to the source radio cell, as noted in program flow block 254. Processing then returns to block 202 of FIG. 5A to determine if additional new data messages have been received on any of the data lines 110.

Referring back to decision block 204 of FIG. 5A, if a dekey command is received on one of the data lines 110, processing of the data message proceeds as shown in block 260. Here, the group ID is decoded from the dekey data message. Processing of the dekey message by the processor 118 is continued in program flow block 262, where the source radio cell ID is determined by virtue of the data line which carried the dekey data message. As noted above, since each data line is uniquely associated with a single mobile radio cell, the data line on which the dekey message is received is utilized to identify the source radio cell from which the dekey message was generated. The cell ID and group ID are utilized as an index to the routing table 120 to find a record that has a group ID matching the group ID decoded from the dekey data message. This is shown in program flow block 264.

In program flow block 266, the routing group number associated with the routing record having the matching group ID is determined. Then, the routing group number is used as an index to the call connection table 122, as noted in block 268. The particular connection information record is found which matches the routing group number determined in the routing table 120 (program flow block 270). As noted in block 272, the processor 118 communicates with the operating system to cancel the timer associated with the group ID. The timer ID associated with the group ID is found in field 160 of the appropriate connection information record of the connection table 122. The in-use flag of 30 the group is then set by the processor 118 to an idle state (program flow block 274). This is accomplished by programming in field 156 of the connection information record 150 the appropriate state of the in-use flag. A corresponding dekey data message is assembled and transmitted by the processor 118 on the respective data lines 110 to the destination radio cells, as shown by program flow block 276. In block 278, the voice lines associated with the destination cells involved in the dispatch communication are then idled. An affirmative acknowledgment is sent by the processor 118 to the source radio cell initiating the dekey data message. This is shown in program flow block 280. Processing of the dekey message then terminates, and a return is made to program flow block 202 to process any other data message received on the data lines 110.

The functions carried out by the hub controller processor 118 in terminating a dispatch call, noted by program flow blocks 220 and 232, constitute the transmission of a negative acknowledgment to the source radio cell. Since no resources have yet been allocated in the call processing routine, no functions have to be carried out to remove or reallocate the resources to other calls in process. Processing branches from blocks 220 and 232 to block 202, where dispatch call processing continues, as described above.

Figure 6:
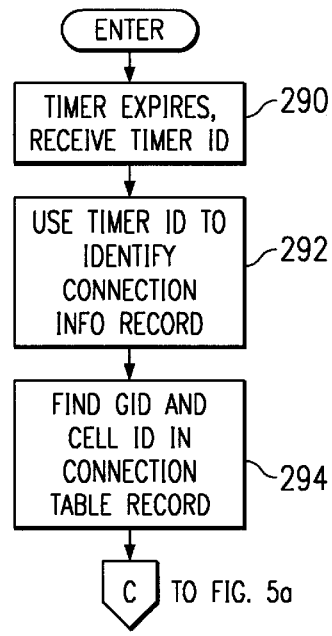
FIG. 6 illustrates the operation of the hub controller in terminating a dispatch communication in response to the expiration of the timer.

The processor 118 is programmed to take into account those situations in which a dispatch communication has in fact been completed, but no corresponding dekey command has been received by the hub controller 10. This can occur if the user of the mobile radio maintains the push-to-talk button depressed for an extended period of time even though the communication has been completed. There are other situations where a dekey command has in fact been transmitted by the mobile radio, but due to modem or data line problems, such message is not received by the hub controller 10. Many other situations can arise in which the dekey message is not properly decoded by the hub controller 10. In such situations, the resources of the network allocated to the call are tied up and prevented from being used by other mobile radios requesting service. In this event, the processor 118 is programmed with software similar to that shown in FIG. 6. FIG. 6 shows the functions programmed to carry out a time-out routine. As noted above, for each dispatch communication initiated, the operating system of the processor 118 starts a timer. In the event the timer times out, the operating system sends a message to the software of the invention that the timer has expired. An identification of the timer is also sent. The expiration of the timer and the receipt of the timer ID is shown in block 290. In program flow block 292, the timer ID is utilized to identify the appropriate connection information record 150. Essentially, the processor 118 searches through field 160 of each connection information record of the connection table 122, until a match is found with the timer ID. Then, the corresponding group ID and cell ID of the connection information record is obtained, as noted in program flow block 294. The processing branches from the flowchart of FIG. 6 to program flow block 264 of FIG. 5A. Termination of the call continues in the manner described above with regard to a dekey command. In this manner, the resources of the multi-site dispatch communication network are not tied up for unduly long periods of time to the exclusion of other calls.

From the foregoing, it can be seen that by utilization of data stored in a routing table and a connection table, call processing is expedited by reducing the time in establishing dispatch communications, as well as the termination thereof. While the preferred embodiment of the invention has been disclosed with reference to a specific structure and operation of a multi-site dispatch communication network, it is to be understood that many changes in detail may be made as a matter of engineering or software choices, without departing from the spirit and scope of the invention, as defined by the appended claims.

```
// Routing Information Table
/***********************************************************
The structure of the routing information table is as follows:
GroupNo  Cell_0  GID_0  Cell_1  GID_1  ...  Cell_n  GID_n
  1       0      01      1      11            n      n1
***********************************************************/
// routing information for cells
```

-continued

```
// this class stores the routing information for one call
class RoutingInfoClass
{
private:
protected:
public:
   int iGroupNo;
   // number of cells in the group
   int iNumberOfCells;
   // group status - enabled or disabled
   int iStatus;
   int iCellNoArray[MAX_CELLS];           // for storing cells 0 to 15
   unsigned long ulGIDArray[MAX_CELLS];   // GID for the cell
};
// this class stores the routing information table
class RoutingTableClass : public CObject
{
private:
protected:
   RoutingInfoClass RouteInfo [MAX_ROUTING_GROUPS];
public:
// implementation
public:
   RoutingTableClass();
   RoutingTableClass(void *pDoc_);
   ~RoutingTableClass();
   int Initialize(void *pDoc_);
   int SetGID(int iGroupNo_, int iCellNo_, unsigned long ulGID_);
   int GetGroupNumber(int iCellNo_, unsigned long ulGID_);
   int SetGroupNumber(int iGroupNo_);
   int GetGroupRoutingInfo(RoutingInfoClass *pRouteInfo_);
   int GetGroupRoutingInfo( int iSourceCellNo_,
                            unsigned long ulSourceGID_,
                            RoutingInfoClass* pRouteInfo_);
   int SetGroupRoutingInfo(RoutingInfoClass *pRouteInfo_);
   int GetNumberOfCells(int iGroupNo_);
   int SetNumberOfCells(int iGroupNo_, int iNumberOfCells_);
   int GetGroupStatus(int iGroupNo_);
   int SetGroupStatus(int iGroupNo_, int iStatus_);
   int AddGroupMember(int iGroupNo_, int iCellNo_, unsigned long ulGID_);
   int DeleteGroupMember(int iGroupNo_, int iCellNo_, unsigned long ulGID_);
protected:
   int FindGroupIndex(int iCellNo_, unsigned long ulGID_);
};
// Connection Table
/*
   The connection table is used for storing all the connection information
   for a particular call.
   Algorithm :
   When a call comes in, the Hub controller looks up the routing table
   to identify the unique group number of the call based on the Cell number
   and the GID. For call setup, a Connection Table is then built using
   the information in the Routing Table.
*/
class ConnectionInfoClass
{
public:
   int iGroupNo;
   int iInUseFlag;
   int iNumberOfCells;
   intiCellNoArray [MAX_CELLS];       // for storing cells 0 to 15
   int iLineArrayIndex [MAX_CELLS];   // Line index of the line used for the call
   int iPortNumber [MAX_CELLS];       // port number of the port used for the call
   unsigned long ulGIDArray[MAX_CELLS];   // GID for the cell
   unsigned int ulTimerHandle;        // handle of the timer for this connection
   unsigned int ulCallTimeSeconds;
};
class ConnectionTableClass : public COobject
{
protected:
   ConnectionInfoClass ConnectionInfo [MAX_ROUTING_GROUPS];
public:
   ConnectionTableClass(void * pDoc_);
   ~ConnectionTableClass();
   int SetConnectionInfo (int iGroupNo_, ConnectionInfoClass* pConnectionInfo_);
   int GetConnectionInfo(int iGroupNo_, ConnectionInfoClass* pConnectionInfo_);
   int GetInUseFlag(int iGroupNo_);
   int SetInUseFlag(int iGroupNo_);
   int MatchTimerHandle(UINT iTimerHandle_, int *piCellNo_, ULONG *pulGid_);
```

-continued

```
    int SetTimerHandle(int iConnectionIndex_, UINT uiTimerHandle_);
};
```

What is claimed is:

1. A method of controlling dispatch communications in a mobile radio network of the type having a plurality of radio cell sites, a plurality of mobile radio groups and a plurality of mobile radios assigned to each said group, comprising the steps of:

coupling together a plurality of radio cell sites by a hub controller;

programming a memory in said hub controller to store data indicating a relationship, if any, between each said mobile radio group and each said radio cell site;

programming said hub controller to decode a group ID from a data frame transmitted by a mobile radio from a source radio cell site;

programming said hub controller to use the decoded group ID to access said memory to find the radio cell sites related thereto; and connecting the related radio cell sites to said source radio cell site;

storing in a memory of said hub controller data concerning resources utilized in carrying out the connecting step; and storing data concerning said relationship in a first table structure, and storing data concerning said resources in a second table structure, and reading said first table structure to find data that provides a cross reference to said second table structure.

2. A method of controlling dispatch communications in a mobile radio network of the type having a plurality of radio cell sites, a plurality of mobile radio groups and a plurality of mobile radios assigned to each said group, comprising the steps of:

providing a hub controller for controlling dispatch communications between the plurality of mobile radios of a group, where the mobile radios are associated with respective said radio cell sites;

programming the hub controller with a first table for providing an association of each said mobile radio group with the mobile radio cell sites servicing the respective mobile radio groups;

programming the hub controller with a second table for writing therein by said hub controller data identifying resources employed in establishing dispatch communications between the various mobile radios of a one of said groups; and providing cross-referencing data between said first and second tables so that when said hub controller accesses one of said first or second tables, the cross-referencing data read from said one of said first or second tables, the other of said first or second tables can be readily accessed by using said cross-referencing data.

3. The method of claim 2, further including programming static data into said first table by an operator, and programming dynamic data into said second table by said hub controller.

4. The method of claim 2, further including using a group number uniquely related to each said group of mobile radios as said cross-referencing data.

5. The method of claim 2, further including programming an identity of each said mobile radio cell site into said first table, and programming an identification of each said mobile radio group associated with said mobile radio cell site.

6. The method of claim 2, further including programming in said first table a group identification number of each said mobile radio group as associated with a respective mobile radio cell site.

7. The method of claim 2, further including programming a different record of data in said first table, each said record including data associated with a different mobile radio group.

8. The method of claim 2, further including programming into said second table a plurality of records, where each said record including connection information data associated with a different dispatch communication.

9. The method of claim 2, further including programming a busy/idle status in one said first or second tables in association with each said mobile radio group.

10. The method of claim 9, further including programming a processor so that said busy/idle status is changed when an idle voice line is allocated to a cell site originating a dispatch call and when an idle voice line is allocated to at least one destination cell site.

11. The method of claim 2, further including starting a timer when a dispatch call is established, and automatically terminating the dispatch call after a predefined period of time has elapsed by said timer.

12. The method of claim 11, further including writing in said second table a timer identification number of a timer in association with each said dispatch communication.

13. The method of claim 12, further including responding to an elapse of a timer by using a respective timer identification as a cross reference to one said first or second table.

14. The method of claim 13, further including cross referencing said second table with said timer identification to find an identification of telephone lines to idle in response to the elapse of said timer.

15. The method of claim 2, further including identifying a cell site from which a dispatch communication originated by identifying a data line on which a corresponding data communication was received.

16. A dispatch communication mobile radio network, comprising:

a plurality of radio cell sites, a plurality of mobile radio groups and a plurality of mobile radios assigned to each said group;

a hub controller for controlling dispatch communications between the plurality of mobile radios of a group, where the mobile radios are associated with various of the mobile radio cell sites;

said hub controller being programmed with a first table providing an association of each said mobile radio group with the mobile radio cell sites servicing the respective mobile radio groups;

said hub controller being programmed with a second table for writing therein by said hub controller data identifying resources employed in establishing a dispatch communication between the various mobile radios of a group; and cross-referencing data fields for use in cross-referencing between said first and second tables so that when said hub controller accesses one of said first or second tables, data read from said cross-referencing field of said one of said first or second tables, the other of said first or second tables can be readily accessed by using said cross-referencing data.

17. A dispatch communication mobile radio network, comprising:

a hub controller having a switching network for switchably coupling a plurality of telephone lines together, where the telephone lines extend to respective radio cell sites, said hub controller including a modem for receiving and transmitting data from and to said radio cell sites;

said hub controller including a programmed processor responsive to data received by said modem for coupling together ones of said telephone lines via said switching network;

said processor being programmed with a routing table and with a connection table;

said routing table including a plurality of records, each record being associated with a different mobile radio group, and each said record being identified by a routing group number and associating a group ID for the mobile radio group for each radio cell site serving the mobile radio group; and said connection table including a plurality of records, each record being associated with a routing group number, an in-use flag field showing whether a mobile radio group is in a busy/idle state, and a plurality of fields, each said field showing an identification of a telephone line coupling the hub controller to a respective radio cell site serving a mobile radio group.

18. The mobile radio dispatch network of claim 17, further including a timer for providing a predetermined period of time, and said processor is programmed to terminate a dispatch communication on an elapse of said timer.

19. The mobile radio dispatch network of claim 18, wherein said connection table includes a field storing an ID for said timer.

* * * * *